United States Patent
Zhang et al.

(10) Patent No.: US 12,112,528 B2
(45) Date of Patent: Oct. 8, 2024

(54) METHOD AND APPARATUS FOR PROCESSING IMAGES, DEVICE AND STORAGE MEDIUM

(71) Applicant: BIGO TECHNOLOGY PTE. LTD., Singapore (SG)

(72) Inventors: Zhuanghui Zhang, Guangzhou (CN); Zhujin Liang, Guangzhou (CN); Jundong Wang, Guangzhou (CN); Depeng Liang, Guangzhou (CN); Shuye Zhang, Guangzhou (CN)

(73) Assignee: BIGO TECHNOLOGY PTE. LTD., Singapore (SG)

( * ) Notice: Subject to any disclaimer, the term of this patent is extended or adjusted under 35 U.S.C. 154(b) by 587 days.

(21) Appl. No.: 17/418,692

(22) PCT Filed: Dec. 26, 2019

(86) PCT No.: PCT/CN2019/128573
§ 371 (c)(1),
(2) Date: Jun. 25, 2021

(87) PCT Pub. No.: WO2020/135554
PCT Pub. Date: Jul. 2, 2020

(65) Prior Publication Data
US 2022/0083808 A1    Mar. 17, 2022

(30) Foreign Application Priority Data

Dec. 29, 2018    (CN) .......................... 201811648151.2

(51) Int. Cl.
*G06V 10/80*    (2022.01)
*G06F 18/214*    (2023.01)
(Continued)

(52) U.S. Cl.
CPC .......... *G06V 10/806* (2022.01); *G06F 18/214* (2023.01); *G06F 18/253* (2023.01);
(Continued)

(58) Field of Classification Search
None
See application file for complete search history.

(56) References Cited

U.S. PATENT DOCUMENTS

2018/0225828 A1    8/2018    Guo et al.
2019/0361994 A1*   11/2019   Shen ................. G06F 16/51

FOREIGN PATENT DOCUMENTS

CN    107886093 A   *   4/2018   .......... G06K 9/3233
CN    108154518 A        6/2018
(Continued)

OTHER PUBLICATIONS

International Search Report of the International Searching Authority for State Intellectual Property Office of the People's Republic of China in PCT application No. PCT/CN2019/128573 issued on Mar. 26, 2020, which is an international application corresponding to this U.S. application.
(Continued)

*Primary Examiner* — Fan Zhang
(74) *Attorney, Agent, or Firm* — Kolitch Romano Dascenzo Gates LLC

(57) ABSTRACT

A method for processing images, including: acquiring an original image and auxiliary information of the original image; acquiring an object feature map by inputting the original image into a main path of a first visual task processing model, and acquiring an auxiliary feature map by inputting the auxiliary information into a branch path of the first visual task processing model; and acquiring a response map of the original image by fusing the object feature map and the auxiliary feature map and inputting fused object
(Continued)

feature map and auxiliary feature map into the main path of the first visual task processing model.

13 Claims, 5 Drawing Sheets

(51) Int. Cl.
  *G06F 18/25* (2023.01)
  *G06N 3/04* (2023.01)
  *G06V 10/774* (2022.01)
  *G06V 10/82* (2022.01)
  *G06V 20/40* (2022.01)

(52) U.S. Cl.
  CPC ............ *G06N 3/04* (2013.01); *G06V 10/774* (2022.01); *G06V 10/82* (2022.01); *G06V 20/40* (2022.01); *G06V 20/46* (2022.01)

(56) References Cited

FOREIGN PATENT DOCUMENTS

| CN | 108229455 A | 6/2018 | |
|---|---|---|---|
| CN | 108288035 A | 7/2018 | |
| CN | 108447078 A | 8/2018 | |
| CN | 108492319 A | 9/2018 | |
| CN | 108846332 A | 11/2018 | |
| CN | 108875654 A | 11/2018 | |
| CN | 108876813 A | 11/2018 | |
| IN | 108961220 A | 12/2018 | |
| KR | 101983684 B1 * | 5/2019 | ............... G06N 3/04 |

OTHER PUBLICATIONS

The State Intellectual Property Office of People's Republic of China, First Office Action in Patent Application No. CN201811648151.2 issued on Nov. 16, 2020, which is a foreign counterpart application corresponding to this U.S. Patent Application, to which this application claims priority.

The State Intellectual Property Office of People's Republic of China, Second Office Action in Patent Application No. CN201811648151.2 issued on Mar. 17, 2021, which is a foreign counterpart application corresponding to this U.S. Patent Application, to which this application claims priority.

* cited by examiner

METHOD AND APPARATUS FOR PROCESSING IMAGES, DEVICE AND STORAGE MEDIUM

CROSS-REFERENCE TO RELATED APPLICATION

This application is a US national stage of international application No. PCT/CN2019/128573, filed on Dec. 26, 2019, which claims priority to the Chinese Patent Application No. 201811648151.2, filed with the China National Intellectual Property Administration on Dec. 29, 2018. Both applications are herein incorporated by reference in their entireties.

TECHNICAL FIELD

Embodiments of the present disclosure relate to the field of computer vision technologies, such as a method and apparatus for processing images, a device and a storage medium.

BACKGROUND

Computer vision is a science that studies how to use machines to simulate the visual processing functions of human and biology. The computer vision replaces human eyes with a camera to acquire visual information and replaces the brain with a computer to process and analyze information, and thus accomplish tasks such as image classification, image segmentation, object detection, key point positioning, posture estimation, and human face recognition.

With the improvement of the performance of computer hardware and the emergence of large-scale image data, deep learning is applied widely in the field of computer vision. Deep learning, derived from the research of artificial neural networks, is an important branch of machine learning, and has formed a new end-to-end mode. The motivation of deep learning is to simulate the learning manner of human brain and build a deep convolutional neural network, and then understand data. Deep learning refers to a deep convolutional neural network. The recognition method of computer vision extracts manual features from the perception of different colors, textures and edge modules in images. A deep convolutional neural network is a deep network structure composed of a variety of different linear layers and non-linear layers and can extract features from shallow to deep and from concrete to abstract. These high-level features automatically extracted through the network have strong expression ability and can extract many abstract concepts and semantic information in images, such as target objects in the images and positions of the target objects.

SUMMARY

According to an embodiment of the present disclosure, there is provided a method for processing images. The method includes:
acquiring an original image and auxiliary information of the original image;
acquiring an object feature map by inputting the original image into a main path of a first visual task processing model, and acquiring an auxiliary feature map by inputting the auxiliary information into a branch path of the first visual task processing model; and
acquiring a response map of the original image by fusing the object feature map and the auxiliary feature map and inputting fused object feature map and auxiliary feature map into the main path of the first visual task processing model.

According to an embodiment of the present disclosure, there is provided an apparatus for processing images. The apparatus includes:
an original image and auxiliary information acquiring module configured to acquire an original image and auxiliary information of the original image;
a feature map acquiring module configured to acquire an object feature map by inputting the original image into a main path of a first visual task processing model, and acquire an auxiliary feature map by inputting the auxiliary information into a branch path of the first visual task processing model; and
an original image response map acquiring module configured to acquire a response map of the original image by fusing the object feature map and the auxiliary feature map and inputting fused object feature map and auxiliary feature map into the main path of the first visual task processing model.

According to an embodiment of the present disclosure, there is provided a device. The device includes:
one or more processors; and
a memory configured to store one or more programs,
wherein the one or more programs is executed by the one or more processors to cause the one or more processors to realize the method according to the embodiments of the present disclosure.

According to an embodiment of the present disclosure, there is provided a computer-readable storage medium which stores a computer program thereon. When the computer program is executed by a processor, the method according to the embodiments of the present disclosure is realized.

DETAILED DESCRIPTION

The present disclosure will be further described hereinafter in combination with the drawings and embodiments. The embodiments described herein are merely used to explain the present disclosure, but not intended to limit the present disclosure. The accompanying drawings only illustrate the parts related to the present disclosure, instead of all the structures.

At least the following problems exist in the related art: although deep learning is applied widely in the image classification, image segmentation, object detection, key point positioning, posture estimation, human face recognition and etc., due to the situations such as complicated and changeable scenes and/or the difficulty in identifying objects, the visual task processing model generated based on the training of deep learning does not have high prediction accuracy when processing visual tasks.

Embodiments of the present disclosure provide a method and apparatus for processing images, a device and a storage medium to improve a prediction accuracy of a visual task processing model.

Embodiments

In order to solve the above technical problem that the visual processing model generated based on the training of deep learning does not have high prediction accuracy when processing visual tasks, prior knowledge may be added. The so-called prior knowledge may be understood as auxiliary information related to an original image. The above content will be described below in combination with the embodiments.

Figure 1:
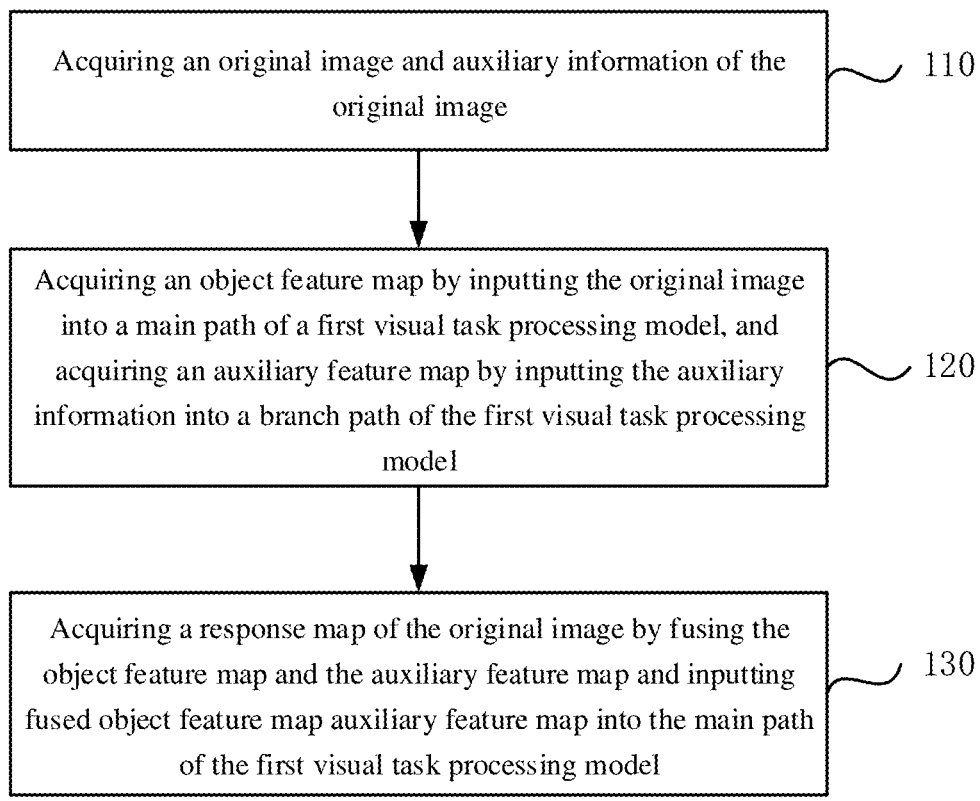
FIG. 1 is a flowchart of a method for processing images according to an embodiment of the present disclosure.

FIG. 1 is a flowchart of a method for processing images according to an embodiment of the present disclosure. The present embodiment is suitable for processing visual tasks. The method may be executed by an apparatus for processing images, and the apparatus may be implemented in a way of software and/or hardware and may be configured in a device, such as a computer or a mobile terminal. As shown in FIG. 1, the method includes step 110 to step 130.

In step 110, an original image and auxiliary information of the original image are acquired.

In embodiments of the present disclosure, in order to improve prediction accuracy of a visual task processing model, an original image is acquired, and auxiliary information related to the original image is also acquired. The auxiliary information related to the original image may be used as the prior knowledge.

The original image may be understood as an image to which the visual tasks need to be executed. The visual tasks may include image classification, image segmentation, object detection, key point positioning, posture estimation, and the like. In some embodiments, the original image may be a single image, or a video frame in a video.

If the original image is a single image, the auxiliary information of the original image may include a background image corresponding to the original image, and the background image corresponding to the original image may be understood as follows: the original image includes a target object, while the background image is an image which does not include the target object. In some embodiments, the background image is an image acquired by removing the target object from the original image. In an exemplary embodiment, for example, an image acquired by using a camera to shoot a sleeping kitten in a corner of a room is the original image, while the image acquired by using the camera to shoot this corner of the room is the background image, and the target object is the sleeping kitten.

If the original image is a video frame in a video and the video frame is used as a current video frame which is not a first frame of the video, and the auxiliary information of the original image may include the previous video frame of the current video frame and a response map of the previous video frame.

In step 120, an object feature map is acquired by inputting the original image into a main path of a first visual task processing model, and an auxiliary feature map is acquired by inputting the auxiliary information into a branch path of the first visual task processing model.

In step 130, a response map of the original image is acquired by fusing the object feature map and the auxiliary feature map and inputting fused object feature map and auxiliary feature map into the main path of the first visual task processing model.

In the embodiments of the present disclosure, the response map of the original image may be understood as the result acquired by executing a corresponding type of visual task to the original image. The form of the response map of the original image is determined according to the type of the visual task. For example, if the visual task is the image segmentation (image segmentation is to classify each pixel in an image according to its category), the response map of the original image may be a probability map of the category of each pixel in the original image, or may be an image semantics segmentation map converted from the probability map by setting a probability threshold; if the visual task is the object detection, the response map of the original image may be a map including a pre-selection box and the target object is in the pre-selection box; and if the visual task is the key point positioning, the response map of the original image may be a heat map generated based on the position of the key point.

The first visual task processing model may be generated based on the training of convolutional neural network. The first visual task processing model may include a main path and a branch path. The convolutional neural network is a multi-layer neural network, and may include a convolutional layer, a pooling layer, a nonlinear activation layer and a fully connected layer. Each layer is composed of a plurality of feature maps, while the pixel in each feature map represents a neuron. The feature map may be represented by W×H×K, wherein, W represents a width of the feature map, H represents a length of the feature map, K represents a number of channels, and W×H represents a size of the feature map. In the convolutional neural network, the number of channels indicates the number of convolution kernels in each convolutional layer. The above-mentioned convolutional layer, the pooling layer, the nonlinear activation layer and the fully connected layer are the network structure of the convolutional neural network. The above-mentioned network has a relatively complicated structure and a relatively large amount of parameters. In order to simplify the structure of the network and decrease the amount of the parameters, lightweight convolutional neural networks may be used, such as a fully convolutional neural network. The so-called fully convolutional neural network is a convolutional neural network which does not include the fully connected layer. The structure of the first visual task processing model will be described hereinafter based on the first visual task processing model generated by training of the fully convolutional neural network. In some embodiments, the main path of the first visual task processing model includes a first down-sampling module and an up-sampling module. An output end of the first down-sampling module is connected with an input end of the up-sampling module. The branch path of the first visual task processing model includes a second down-sampling module, and the first down-sampling module is connected in parallel with the second down-sampling module. Each down-sampling module may include M convolutional layers, and each up-sampling module may include M transposed convolutional layers. A batch normalization layer and a nonlinear activation layer may be connected after each convolutional layer. After an image passes through the first down-sampling module and the second down-sampling module, a down-sampling feature map is acquired. The down-sampling feature map contains feature information of the image. In addition, since the size of the down-sampling feature map is reduced compared with the size of an input image, the down-sampling feature map has a larger receptive field and may provide more context information. An up-sampling feature map is acquired by inputting the down-sampling feature map into the up-sampling module, and the up-sampling feature map has the same size with that of the input image. In some embodiments, the specific form of the structure of the first visual task processing model may be designed according to actual circumstances.

The object feature map is acquired by inputting the original image into the main path of the first visual task processing model. The object feature map herein may be the down-sampling feature map acquired through the first down-sampling module as described in the above text. The object feature map includes the feature information of the original image. The auxiliary feature map is acquired by inputting the auxiliary information into the branch path of the first visual task processing model. The auxiliary feature map herein may be the down-sampling feature map acquired through the second down-sampling module as described in the above text. The auxiliary feature map includes the feature information of the auxiliary information of the original image.

The response map of the original image is acquired by fusing the object feature map and the auxiliary feature map and inputting fused object feature map and auxiliary feature map into the main path of the first visual task processing model. The response map of the original image herein may be the up-sampling feature map acquired through the up-sampling module as described in the above text. In some embodiments, since the auxiliary information of the original image also participates in the process of generating the response map of the original image, that is, the prior knowledge also participates in the process of generating the response map of the original image. In other words, the auxiliary information of the original image as the prior knowledge plays the role of improving the prediction accuracy of the model in the process of generating the response map of the original image, the response map of the original image which is generated with the participation of the auxiliary information of the original image is more accurate than the response map of the original image generated only with the participation of the original map while without the auxiliary information of the original image.

In some embodiments, the object feature map has the same size with that of the auxiliary feature map, and the object feature map has the same number of channels with that of the auxiliary feature map. In order to achieve that the object feature map has the same size with that of the auxiliary feature map, the first down-sampling module and the second down-sampling module as described above may be configured to have the same structure and the same number of the convolution kernels, that is, the first down-sampling module and the second down-sampling module may be configured to have the same number of the convolutional layers and the same number of the convolution kernels. The following two manners may be used for fusing the object feature map and the auxiliary feature map, which include: a first manner, where the object feature map and the auxiliary feature map are fused in a manner of addition without carry, and a second manner, where the object feature map and the auxiliary feature map are fused in a manner of channel interaction. Which manner is used to fuse the two may be set according to actual situations.

In some embodiments, when the original image is a video frame of a video, the auxiliary information of the original image includes a previous video frame and the response map of the previous video frame, and the response map of the previous video frame may be a map acquired by inputting the previous video frame as an input variable into the first visual task processing model. In addition, considering that the auxiliary information of the original image needs to be used as the prior knowledge to improve the prediction accuracy of the model, and thus it is required to ensure the accuracy of the response map of the previous video frame in the auxiliary information of the original image as the prior knowledge, and the higher accuracy the better. In order to improve the accuracy of the response map of the previous video frame in the auxiliary information of the original image, a visual processing model with higher prediction accuracy may be selected, that is, the previous video frame, which satisfies a preset conditions and is used as an input variable, is not input into the first visual task processing model but is input into a visual processing model which has higher prediction accuracy than the first visual task processing model. Usually, the higher the prediction accuracy of a model is, the more complicated the structure of the model is and the larger the number of parameters is. In this case, the computational cost is greater, and correspondingly, the prediction efficiency of the model is lower. As described above, in order to obtain a response map of the previous video frame with higher accuracy, a visual model with higher prediction accuracy is selected, which improves the accuracy of the response map of the previous video frame while reduces the prediction efficiency of the model at the same time. Based on the above, whether to input the previous video frame as an input variable into the first visual task processing model to acquire the response map of the previous video frame, or whether to input the previous video frame as an input variable into a model with higher prediction accuracy than that of the first visual task processing model to acquire the response map of the previous video frame may be determined according to actual situations, and it includes the following two manners:

A first manner. When the previous video frame belongs to one of first N video frames of a video, the response map of the previous video frame is acquired by inputting the previous video frame as an input variable into a model with higher prediction accuracy than the first visual task processing model does. When the previous video frame does not belong to one of the first N video frames of the video, the response map of the previous video frame is acquired by inputting the previous video frame as an input variable into the first visual task processing model, and N is a positive integer. The reason why the above processing may be conducted is that: a plurality of video frames in the video usually have relevancy therebetween, and thus the response maps of the first N video frames are acquired by inputting the plurality of video frames as an input variables into the model with higher prediction accuracy than the first visual task processing model does, and thus it may ensure the accuracy of the response map of the previous video frame in the auxiliary information of the original image as the prior knowledge. In some embodiments, the above first manner takes the video as a unit to determine the manner of acquiring the response map of the previous video frame.

A second manner. If the duration of the video is greater than or equal to a duration threshold, the accuracy of the previous video frame acquired by using the first manner may not satisfy actual requirements. Based on the above, a plurality of video frames in the video may be divided into two or more video frame sequences according to a time order, the plurality of video frame sequences do not overlap each other, and the numbers of video frames included in the video frame sequences may be the same or different, and they may be determined according to actual situations. In some embodiments, each video frame sequence may be divided into a first video frame, a second video frame, . . . , and a $P^{th}$ video frame according to a time order. In some embodiments, the previous video frame will belong to one video frame sequence of the plurality of the video frame sequences. After the video is subjected to the above-mentioned processing and the plurality of video frame sequences are acquired, the manner of acquiring the response map of the previous video frame will be changed from taking the video as a unit into consideration in the first manner to taking the video frame sequence as a unit into consideration. In some embodiments, when the previous video frame belongs to one of first T video frames of a video frame sequence corresponding to the previous video frame, the previous video frame is input as an input variable into a model with higher prediction accuracy than the first visual task processing model to acquire the response map of the previous video frame; and when the previous video frame does not belong to one of the first T video frames in the video frame sequence corresponding to the previous video frame, the previous video frame is input as an input variable into the first visual task processing model to acquire the response map of the previous video frame, and T is a positive integer. The reason why the above processing may be conducted is that: a plurality of video frames in a video sequence usually have relevancy therebetween, and thus the response maps of the first N video frames in each video sequence are acquired by inputting the plurality of video frames as input variables into the model with higher prediction accuracy than the first visual task processing model does, and thus it may ensure the accuracy of the response map of the previous video frame in the auxiliary information of the original image as the prior knowledge. Meanwhile, the manner of acquiring the response map of the previous video frame is determined by taking the video frame sequence rather than the video as a unit, thereby improving the accuracy of the response map of the previous video frame in the auxiliary information of the original image.

In some embodiments, if the original image is a current video frame which is not a first frame of a video, the auxiliary information of the original image includes the previous video frame of the current video frame and the response map of the previous video frame, and whether to adjust the presentation form of the response map of the previous video frame is determined according to the types of visual tasks. For example, if the visual task is the image segmentation, the response map of the previous video frame is the probability map of the category of each pixel in the previous video frame, or the response map of the previous video frame is an image semantic segmentation map converted from the probability map by setting a probability threshold, and the presentation form of the response map of the previous video frame of the image segmentation may be directly used as an input variable and input into a branch path of the first visual task processing model, and no adjustment is required. If the visual task is the object detection, the response map of the previous video frame is a map including a pre-selection box, the map including the pre-selection box is adjusted; the pixel value of the pixel in the pre-selection box may be selectively set to be 1, and the pixel value of the pixel outside the pre-selection box may be selectively set to be 0, and the adjusted response map of the previous video frame is input as an input variable to the branch path of the first visual task processing model. In some embodiments, the pixel value of the pixel outside the pre-selection box may be set according to actual situations. If the visual task is key point positioning, the response map of the previous video frame is a heat map generated based on the position of the key point, the response map of the previous video frame may be directly input as an input variable into the branch path of the first visual task processing model and the presentation form of the response map of the previous video frame does not need to be adjusted.

According to the technical solution of the present embodiment, the object feature map is acquired by acquiring the original image and the auxiliary information of the original image, and inputting the original image into the main path of the first visual task processing model, and the auxiliary feature map is acquired by inputting the auxiliary information into the branch path of the first visual task processing model; and the response map of the original image is acquired by fusing the object feature map and the auxiliary feature map and inputting fused object feature map and auxiliary feature map into the main path of the first visual task processing model. In the above process of generating the response map of the original image with the participation of the auxiliary information of the original image, since the auxiliary information of the original image may provide relatively strong prior knowledge which helps to solve the problems which affect the prediction accuracy of the visual task processing model, such as complicated and changeable scenes and/or the difficulty in identifying objects, and thus the prediction accuracy of the visual task processing model is improved.

Optionally, based on the above technical solution, the auxiliary information of the original image includes a background image corresponding to the original image.

In some embodiments of the present disclosure, the auxiliary information of the original image may include the background image corresponding to the original image. As described in the above text, the background image of the original image may be understood as follows: the original image includes the target object, while the background image is an image which does not include the target object. In other words, the background image is an image acquired by removing the target object from the original image. The function of the above understanding on the background image will be described hereinafter.

In some embodiments, in the process of processing visual tasks, the following situations may occur: when the visual task is the image segmentation, the foreground and the background may be confused or the edges of the response map of the original image may be rough, and in this case, the response map of the original image may be an image semantic segmentation map; when the visual task is the object detection, there may be a situation where the generated pre-selection box jitters seriously; when the visual task is the key point positioning, there may be a situation where the key point could not be identified or the key point jitters. In some embodiments, the above situations show that the prediction accuracy of the model is not high, and the reason why the prediction accuracy of the model is not high is the complicated and changeable scene, rather than that the target object itself is difficult to be recognized. Compared with the target object, the complicated and changeable scene may be understood as background interference information. Based on the above, since the background image is the image in which the target object is removed, and compared with the original image, the background image only includes the background interference information. The auxiliary feature map is acquired by inputting the background image as an input variable into the branch path of the first visual task processing model, the auxiliary feature map will extract the feature of the background interference information, and the auxiliary feature map participates in the process of generating the response map of the original image, so that the generated response map of the original image is a response map for suppressing background interference. In some embodiments, when the background image is an image in which the target object is removed from the original image, the background image as the prior knowledge has the function of suppressing the background interference and thus the prediction accuracy of the model is improved.

Optionally, based on the above technical solution, when the original image is a current video frame and the current video frame is not a first frame of the video, the auxiliary information of the original image includes the previous video frame of the current video frame and the response map of the previous video frame.

In some embodiments of the present disclosure, for the situation that the original image is the current video frame in a video, and the auxiliary information of the original image includes the previous video frame of the current video frame and the response map of the previous video frame. In the process of processing the visual tasks, the following situations may occur: when the visual task is the image segmentation, there may be serious flickering of segmentation masks between different video frames; when the visual task is the object detection, there may be serious jitters of the pre-selection boxes generated in several consecutive video frames; when the visual task is the key point positioning, the key points in adjacent video frames may shake. In some embodiments, the above situations show that the prediction accuracy of the model is not high, and the reason why the prediction accuracy of the model is not high is that the object and/or the scene is difficult to be recognized. Based on the above, since two adjacent video frames have a certain relevancy, the response maps of the two adjacent video frames also have a certain relevancy, in other words, the response map of the previous video frame is of a relatively high reference to the generation of the response map of the current video frame, that is, the response map of the previous video frame may be used as the prior knowledge to participate in the process of generating the response map of the current video frame. In some embodiments, the above process may be that the auxiliary feature map is acquired by inputting the response map of the previous video frame as an input variable into the branch path of the first visual task processing model, and the auxiliary feature map will extract the feature of the previous video frame and participate in the process of generating the response map of the current video frame. The response map of the previous video frame as the prior knowledge has the function of increasing the consecutiveness between frames and further improving the prediction accuracy of the model. In some embodiments, since the previous video and the response map of the previous video provide relatively strong prior knowledge, the structure of the first visual task model generated based on the training of the convolutional neural network may be simplified as much as possible to improve the prediction efficiency of the model.

In some embodiments, according to the above text, whether to input the previous video frame as an input variable into the first visual task processing model to acquire the response map of the previous video frame, or whether to input the previous video frame as an input variable to a model with higher prediction accuracy than that of the first visual task processing model to acquire the response map of the previous video frame may be determined according to actual situations.

Optionally, based on the above technical solution, the following manners may be used to acquire the response map of the previous video frame: when the previous video frame belongs to one of first N video frames of a video, the response map of the previous video frame is a response map acquired by inputting the previous video frame into a second visual task processing model; and when the previous video frame does not belong to one of the first N video frames of the video, the response map of the previous video frame is a response map acquired by inputting the previous video frame into the first visual task processing model. The second visual task processing model has higher prediction accuracy than that of the first visual task processing model, and N is a positive integer.

In some embodiments of the present disclosure, considering that auxiliary information of the original image is used as the prior knowledge to improve the prediction accuracy of the model, and thus it is required to ensure the accuracy of the response map of the previous video frame in the auxiliary information of the original image as the prior knowledge, and the higher accuracy the better. In order to improve the accuracy of the response map of the previous video frame in the auxiliary information of the original image, a visual processing model with higher prediction accuracy may be considered and selected, that is, the previous video frame as an input variable is not selected to be input into the first visual task processing model, but is selected to be input into a visual processing model which has higher prediction accuracy than that of the first visual task processing model. Usually, the higher the prediction accuracy of a model is, the more complicated the structure of the model is and the larger the number of parameters is. In this case, the computational cost is greater, and the prediction efficiency of the model is correspondingly lower. As described above, in order to acquire a response map of the previous video frame with higher accuracy, a visual model with higher prediction accuracy is selected, which improves the accuracy of the response map of the previous video frame while reduces the prediction efficiency of the model at the same time. Based on the above, whether to input the previous video frame as an input variable into the first visual task processing model to acquire the response map of the previous video frame, or whether to input the previous video frame as an input variable into a model with higher prediction accuracy than that of the first visual task processing model to acquire the response map of the previous video frame may be determined according to actual situations.

It may be considered that if the previous video frame belongs to one of first N video frames of a video, the previous video frame is used as an input variable and input into the second visual task processing model to acquire the response map of the previous video frame; if the previous video frame does not belong to one of the first N video frames of the video, the previous video frame is used as an input variable and input into the first visual task processing model to acquire the response map of the previous video frame, the second visual task processing model has higher prediction accuracy than that of the first visual task processing model, and N is a positive integer. In some embodiments, the above manner is a manner where a video is taken as a unit to determine the response map of the previous video frame.

The reason why the above processing may be conducted is that: since two adjacent video frames in a video usually have relevancy, the response map of the first N video is acquired by inputting the first N video frames as input variables into the second visual task processing model, and then it may ensure the accuracy of the response map of the video frame as the prior knowledge, that is, the prediction accuracy of the model is ensured. In addition, the second visual task processing model has higher prediction accuracy than the first visual task processing model, and thus the second visual task processing model has a more complicated structure than that of the first visual task processing model. In some embodiments, the second visual task processing model has a larger number of parameters than those of the first visual task processing model. The computational cost will increase with the increasing of the complexity of the model structure and the increasing of the number of the parameters. The increasing of the computational cost means the lowering of the prediction efficiency of the model. Based on the above, the above manner ensures maintaining a relatively high level of computational efficiency of the model while ensures the accuracy of the response map of the previous video frame as the prior knowledge, that is, the above manner takes into account both the prediction accuracy of the model and the prediction efficiency of the model.

In some embodiments, when the visual task object is a video, after the video is processed in above manner, the above manner will enhance the consistency between frames in terms of visual effects. In other words, after the video is processed in the above manner, since the prediction accuracy of the model is improved, the consistency between frames is achieved in a certain degree.

Optionally, based on the above technical solution, the response map of the previous video frame may be acquired in the following manners: when the previous video frame belongs to one of the first T video frames of the video frame sequence corresponding to the previous video frame, the response map of the previous video frame is a response map acquired by inputting the previous video frame into the second visual task processing model; and when the previous video frame does not belong to one of the first T video frames of the video frame sequence corresponding to the previous video frame, the response map of the previous video frame is a response map acquired by inputting the previous video frame into the first visual task processing model. The video frame sequence is one of a plurality of video frame sequences acquired by dividing a plurality of video frames of a video, the second visual task processing model has higher prediction accuracy than the first visual task processing model, and T is a positive integer.

In some embodiments of the present disclosure, if the duration of the video is greater than or equal to the duration threshold, the way of taking a video as a unit to determine the method of acquiring the response map of the previous video frame may not satisfy actual requirements. Based on the above, the plurality of video frames of the video may be divided into two or more video frame sequences according to time order, the plurality of video frame sequences do not overlap each other, and the numbers of the video frames included in video frame sequences may be the same or different, and they can be determined according to actual situations. In some embodiments, each video frame sequence may be divided into a first video frame, a second video frame, . . . , and a $P^{th}$ video frame according to a time order. In some embodiments, the previous video frame will belong to one video frame sequence of the plurality of the video frame sequences. After the video is subjected to the above-mentioned processing and, the manner of acquiring the response map of the previous video frame will be changed from taking the video as the unit into consideration to taking the video frame sequence as the unit into consideration. In some embodiments, if the previous video frame belongs to one of first T video frames of a video frame sequence corresponding to the previous video frame, the response map of the previous video frame is acquired by inputting the previous video frame as an input variable into the second visual task processing model; if the previous video frame does not belong to one of the first T video frames of the video frame sequence corresponding to the previous video frame, the response map of the previous video frame is acquired by inputting the previous video frame as an input variable into the first visual task processing model. The second visual task processing model has higher prediction accuracy than the first visual task processing model, and T is a positive integer.

The reason why the above processing may be conducted is that: a plurality of video frames in the video sequence usually have relevancy, and thus the response maps of the first T video frames in each video sequence is acquired by inputting the plurality of video frames as input variables into the second visual task processing model, and then it may ensure the accuracy of the response map of the previous video frame in the auxiliary information of the original image as the prior knowledge. In some embodiments, the manner of acquiring the response map of the previous video frame is determined by taking the video frame sequence rather than the video as the unit, thereby improving the accuracy of the response map of the previous video frame in the auxiliary information of the original image. In addition, since the second visual task processing model has higher prediction accuracy than the first visual task processing model, the second visual task processing model has a more complicated structure than that of the first visual task processing model, and the second visual task processing model has a larger number of parameters than those of the first visual task processing model. The computational cost will increase with the increasing of the complexity of the model structure and the increasing of the number of the parameters. The increasing of the computational cost means the reducing of the prediction efficiency of the model. Based on the above, the above manner ensures maintaining a relatively high level of computational efficiency of the model while ensures the accuracy of the response map of the previous video frame as the prior knowledge, that is, the above manner takes into account both the prediction accuracy of the model and the prediction efficiency of the model.

Optionally, based on the above technical solution, the following manner may be adopted to train the first visual task processing model: an original training image, the annotation information of the original training image and the auxiliary training information of the original training image are acquired. An object training feature map is acquired by inputting the original training image into the main path of the convolutional neural network, and an auxiliary training feature map is acquired by inputting the auxiliary training information into the branch path of the convolutional neural network. A response map of the original training image is acquired by fusing the object training feature map and the auxiliary training feature map and inputting the fused object training feature map and the auxiliary training feature map into the main path of the convolutional neural network. A loss function of the convolutional neural network is acquired according to the annotation information of the original training image and the response map of the original training image. The network parameter of the convolutional neural network is adjusted according to the loss function until the output value of the loss function is less than or equal to a preset threshold, and the convolutional neural network is used as the first visual task processing model.

In some embodiments of the present disclosure, in order to improve the prediction accuracy of the first visual task processing model, the auxiliary training information which may function as the prior knowledge is considered as the input variable of the first visual task processing model and jointly participates in the training process of the first visual task processing model, and is considered as the input variable of a branch of the first visual task processing model. In some embodiments, a branch into which the original training image is input as the input variable is called as the main path of the first visual task processing model, and a branch into which the auxiliary training information is input as the input variable is called as the branch path of the first visual task processing model. In some embodiments, since the first visual task processing model is generated based on the training of the convolutional neural network, and thus a branch into which the original training image is input as the input variable in the training process is the main path of the convolutional neural network, and a branch into which the auxiliary training information is input as the input variable is the branch path of the convolutional neural network.

The annotation information of the original image will be different according to different types of the visual tasks. For example, when the visual task is the image segmentation, the annotation information of the original image is a real tag of each pixel in the original image, and the real tag indicates the category of the pixel; when the visual task is the object detection, the annotation information of the original image is a target box, and the target box includes the target object; and when the visual task is the key point positioning, the annotation information of the original image is the information of the coordinates of the key point.

An object training feature map is acquired by inputting the original training image into the main path of the convolution neural network, and an auxiliary training feature map is acquired by inputting the auxiliary training information into the branch path of the convolution neural network. In some embodiments, if the original training image is a current training video frame, the auxiliary training information of the original training image may include a previous training video frame and the response map of the previous training video frame; if the original training image is a single image, the auxiliary training information of the original training image may include a background training image. When the original training image is the current training video frame, and the auxiliary training information of the original training image includes the previous training video frame and the response map of the previous training video frame, the auxiliary training feature map may be acquired by inputting the response map of the previous training video frame as the input variable into the second visual task processing model.

The response map of the original training image is acquired by fusing the object training feature map and the auxiliary training feature map and inputting the object training feature map and the auxiliary training feature map into the main path of the convolutional neural network. The loss function of the convolutional neural network is acquired (for example, acquired by calculation) according to the annotation information of the original training image and the response map of the original training image, and the loss function may be a cross entropy loss function, a 0-1 loss function, a square loss function, an absolute loss function, a logarithmic loss function, and the like, which may be set according to actual conditions.

The training process of the convolution neural network is to calculate the loss function of the convolutional neural network through forward propagation, and calculate a partial derivative of the loss function to the network parameter, and use a backward gradient propagation method to adjust the network parameters of the convolutional neural network, until the output value of the loss function of the convolutional neural network is less than or equal to the preset threshold. When the output value of the loss function of the convolutional neural network model is less than or equal to the preset threshold, it indicates that the training of the convolutional neural network is accomplished, and at this time, the network parameter of the convolutional neural network is also determined. Based on the above, the convolutional neural network which training has been accomplished and may be used as the first visual task processing model.

In some embodiments, the convolutional neural network described in the embodiment of the present disclosure may be the fully convolutional neural network, i.e., the fully convolutional neural network as described in the above text, and the form of the structure of the fully convolutional neural network may be designed according to actual situations.

In some embodiments, depending on the different forms of the original training image, the content contained in the auxiliary training information of the original training image will also be different, and based on this, the first visual task processing model acquired through training in the above manner will also be different, and the difference mentioned herein may refer to the different network parameters of the first visual task processing model.

In some embodiments, since the auxiliary training information of the original training image also participates in the training process of the model, and an auxiliary training information model of the original training image as the prior knowledge plays a role of making higher the predication accuracy of the first visual task processing model acquired through training in the training process, the first visual task processing model which is generated with the participation of the auxiliary training information of the original training image has higher prediction accuracy than the first visual task processing model generated only with the participation of the original training image while without the participation of the auxiliary training information of the original training image.

In addition, the second visual task processing model as described in some embodiments of the present disclosure is a model whose training has been accomplished, and the second visual task processing model may be configured to generate the response map of the previous training video frame and the response map of the previous video frame.

Optionally, based on the above technical solution, the auxiliary training information is the auxiliary training information acquired through data enhancement processing.

In some embodiments of the present disclosure, the visual task processing model is generated based on the training of the convolutional neural network. One of the major advantages of convolutional neural network is the ability of absorbing data and transforming the same into continuous learning and updating of parameters to acquire a model having a good prediction performance and a good generalization ability. In order to acquire the model having the good prediction performance and the good generalization ability, the convolutional neural network has requirements for both the number and quality of training samples, in other words, both the number and quality of training samples have an important impact on the prediction performance and generalization ability of the model. Based on the above, it may be considered to process the training sample by using a data enhancement method to increase the number of the training samples and improve the quality of the training samples, so as to enhance the prediction performance and the generalization ability of the model.

For the embodiment of the present disclosure, since the auxiliary training information is used as prior knowledge to improve the prediction performance of the model, the training samples mentioned here refer to auxiliary training information. That is, the embodiment of the present disclosure adopts the data enhancement method to process the auxiliary training information, in other words, the auxiliary training information is the auxiliary training information acquired after being subjected to the data enhancement processing.

That the data enhancement method is used to process the auxiliary training information and thus the quality of the auxiliary training information may be improved may be understood as follows: in practical applications, since the camera is not fixed in most cases, and the original training images and the background training images in the auxiliary training information are taken separately rather than taken at the same time, and thus the shooting angle, brightness, deformation, hue and the like of the original training image and the background training image of the auxiliary training information may not keep consistent, and the degree of this inconsistency may be different in different situations. In order to reflect this difference and make it consistent with actual situations as much as possible, the above-mentioned difference is reflected in the background image in the auxiliary training information. The data enhancement method is a manner in which reflecting the above-mentioned difference may be realized. That is, the background training image in the auxiliary training information subjected to the data enhancement processing may reflect the inconsistency with the original training image in the shooting angle, brightness, deformation and hue in different situations, so that the degree of inconsistency between the two is as consistent as possible with actual situations. In addition, if the original training image is the current training video frame, and the auxiliary training information of the original training image includes the previous training video frame and the response map of the previous training video frame, the data enhancement processing is also conducted to the response map of the previous training video frame, so that the response map of the previous training video frame keeps consistent with the previous training video frame.

Based on the above, the visual task processing model acquired by training and using the original training image and the auxiliary training information subjected to the data enhancement processing as input variables has a better prediction performance and a better generalization ability than the visual task processing model acquired by training and using the original training image and auxiliary training information not subjected to the data enhancement processing as input variables. Thus, when the former is used to process a visual task subsequently, the original image and the auxiliary information of the original image have a small limitation, and the small limitation may indicate that it is not necessary to keep the consistency of the two in brightness, deformation, hue and the like. Meanwhile, even if the two are not in consistency in the above aspects, a prediction result with a relatively high accuracy may still be acquired.

Optionally, based on the above technical solution, the data augmenting processing comprises at least one of translation, rotation, clipping, non-rigid transformation, noise interference and color transformation.

In some embodiments of the present application, the rigid transformation may indicate a transformation in which an image only changes in the position and the orientation, without changing the shape. The non-rigid transformation is a transformation more complicated than the rigid transformation, and the non-rigid transformation may include beveling, twisting, perspective, and etc. The noise disturbance may include a Gaussian noise. The color transformation may include saturation enhancement, brightness enhancement, contrast enhancement, and the like. In some embodiments, the manner of data enhancement may be selected according to actual situations.

Figure 2:
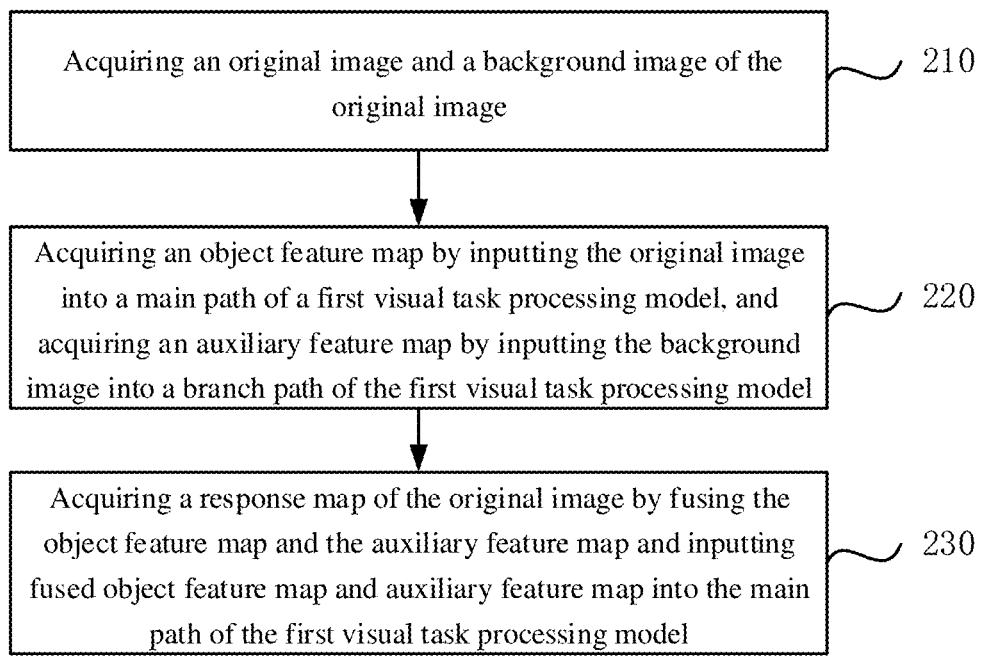
FIG. 2 is a flowchart of another method for processing images according to an embodiment of the present disclosure.

FIG. 2 is a flowchart of another method for processing images according to an embodiment of the present disclosure. The present embodiment may be suitable for the situation of visual task processing. The method may be executed by an apparatus for processing images. The apparatus may be realized in a way of software and/or hardware. The apparatus may be configured in a device, such as a computer or a mobile terminal. As shown in FIG. 2, the method includes step 210 to step 230.

In step 210, an original image and a background image of the original image are acquired.

In step 220, an object feature map is acquired by inputting the original image into a main path of a first visual task processing model, and an auxiliary feature map is acquired by inputting the background image into a branch path of the first visual task processing model.

In step 230, a response map of the original image is acquired by fusing the object feature map and the auxiliary feature map and inputting fused object feature map and auxiliary feature map into the main path of the first visual task processing model.

In some embodiments of the present disclosure, in order to understand the technical solution provided by the embodiment of the present disclosure, description will be made in the following by taking the example that the visual task is image segmentation.

Figure 3:
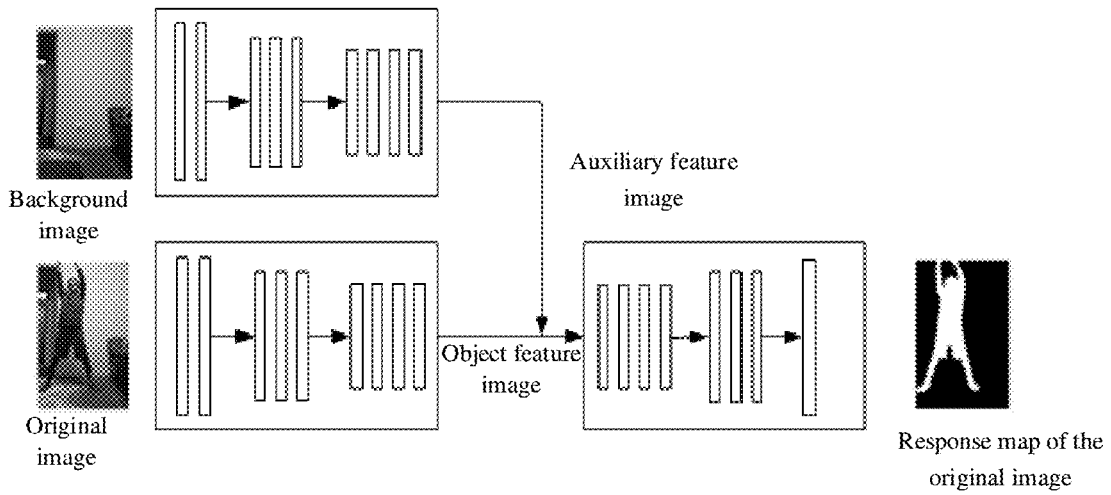
FIG. 3 is a schematic diagram of application of a method for processing images according to an embodiment of the present disclosure.

As shown in FIG. 3, it provides schematic diagram of the application of another method for processing images. In FIG. 3, an object feature map is acquired by inputting the original image into a main path of a first visual task processing model, and an auxiliary feature map is acquired by inputting the background image into a branch path of the first visual task processing model. A response map of the original image is acquired by fusing the object feature map and the auxiliary feature map and inputting fused object feature map and auxiliary feature map into the main path of the first visual task processing model, that is, an image semantic segmentation image is acquired.

In the technical solution of the present embodiment, the object feature map is acquired by acquiring the original image and the background image, and inputting the original image into the main path of the first visual task processing model, and the auxiliary feature map is acquired by inputting the background image into the branch path of the first visual task processing model. A response map of the original image is acquired by fusing the object feature map and the auxiliary feature map and inputting fused object feature map and auxiliary feature map into the main path of the first visual task processing model. In the above process of generating the response map of the original image with the participation of the background image, the background image may provide relatively strong prior knowledge which helps to solve the problems which affect the prediction accuracy of the visual task processing model, such as complicated and changeable scenes and/or the difficulty in identifying objects, and thus the prediction accuracy of the visual task processing model is improved.

Figure 4:
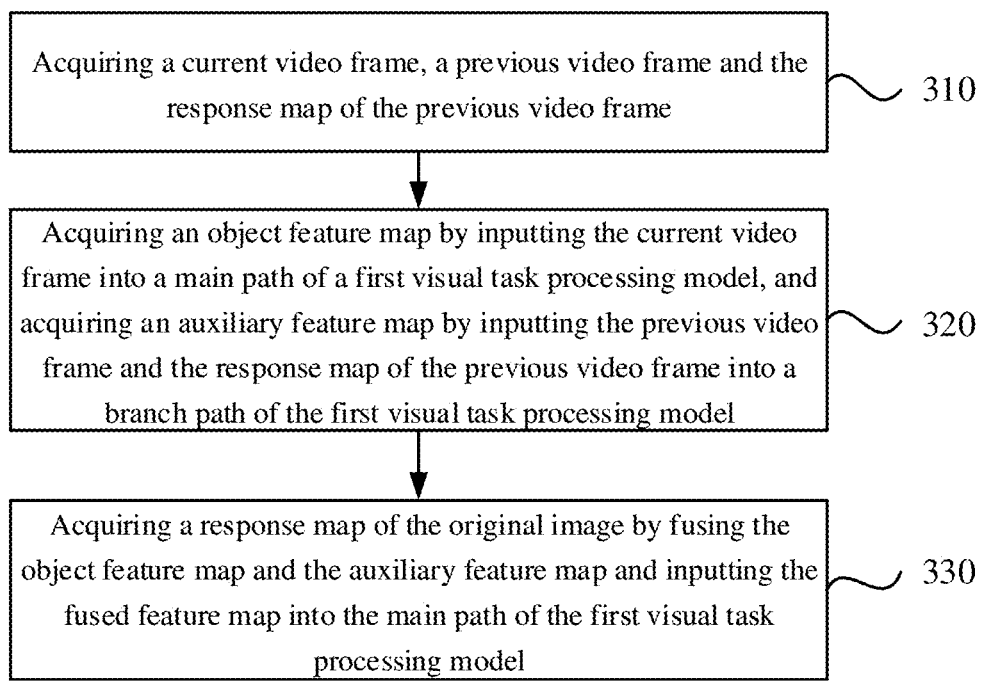
FIG. 4 is a flowchart of yet another method for processing images according to an embodiment of the present disclosure.

FIG. 4 is a flowchart of yet another method for processing images according to an embodiment of the present disclosure. The present embodiment may be applied to the situation of visual task processing. The method may be executed by an apparatus for processing images. The apparatus may be realized by software and/or hardware. The apparatus may be configured in a device, such as a computer or a mobile terminal. As shown in FIG. 4, the method includes step 310 to step 330.

In step 310, a current video frame, a previous video frame and a response map of the previous video frame are acquired.

In step 320, an object feature map is acquired by inputting the current video frame into a main path of a first visual task processing model, and an auxiliary feature map is acquired by inputting the previous video frame and the response map of the previous video frame into a branch path of the first visual task processing model.

In step 330, a response map of the original image is acquired by fusing the object feature map and the auxiliary feature map and inputting fused object feature map and auxiliary feature map into the main path of the first visual task processing model.

In some embodiments of the present disclosure, the response map of the previous video frame may be acquired by the following two manners.

A first Manner. When the previous video frame belongs to one of first N video frames of a video, the response map of the previous video frame is a response map acquired by inputting the previous video frame into a second visual task processing model. When the previous video frame does not belong to one of the first N video frames of the video, the response map of the previous video frame is a response map acquired by inputting the previous video frame into the first visual task processing model. The second visual task processing model has higher prediction accuracy than the first visual task processing model, and N is a positive integer.

A second manner. When the previous video frame belongs to one of first T video frames of a video frame sequence corresponding to the previous video frame, the response map of the previous video frame is a response map acquired by inputting the previous video frame into the second visual task processing model. When the previous video frame does not belong to one of the first T video frames of the video frame sequence corresponding to the previous video frame, the response map of the previous video frame is a response map acquired by inputting the previous video frame into the first visual task processing model. The video frame sequence is one of a plurality of video frame sequences acquired by dividing a plurality of video frames of the video, the second visual task processing model has higher prediction accuracy than the first visual task processing model, and T is a positive integer.

In some embodiments, the manner of acquiring the response map of the previous video frame may be selected according to actual situations.

Description will be made in the following by taking an example that the visual task is image segmentation.

Figure 5:
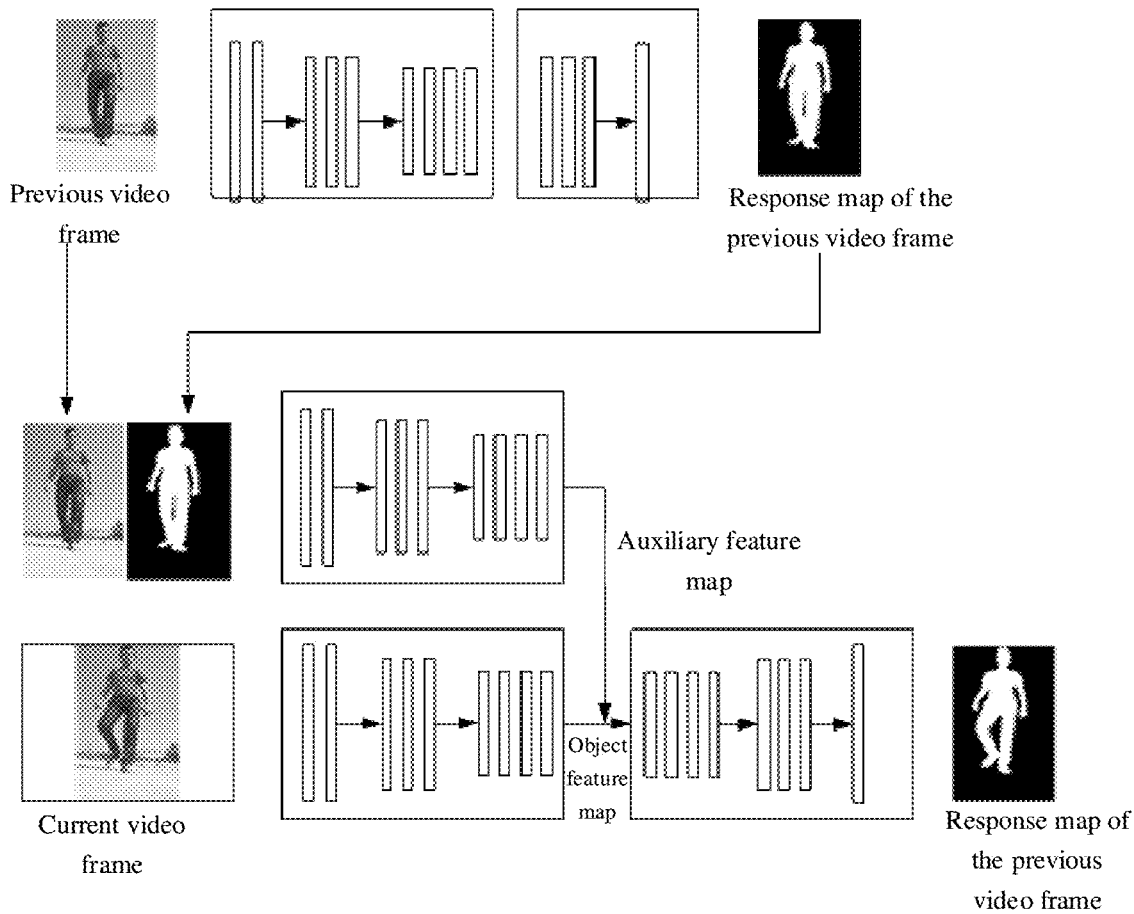
FIG. 5 is a schematic diagram of application of another method for processing images according to an embodiment of the present disclosure.

As shown in FIG. 5, it provides schematic diagram of the application of another method for processing images. In FIG. 5, an object feature map is acquired by inputting the current video frame into a main path of a first visual task processing model, and an auxiliary feature map is acquired by inputting the previous video frame and the response map of the previous video frame into a branch path of the first visual task processing model. The response map of the previous video frame is acquired by inputting the previous video frame into a second visual task processing model. A fused feature map is acquired by fusing the object feature map and the auxiliary feature map; and a response map of the original image is acquired by inputting the fused feature map into the main path of the first visual task processing model, i.e., an image semantic segmentation image is acquired.

In the technical solution of the present embodiment, the object feature map is acquired by acquiring the current video frame, the previous video frame and the response map of the previous video frame, and inputting the current video frame into the main path of the first visual task processing model, and the auxiliary feature map is acquired by inputting the previous video frame and the response map of the previous video frame into the branch path of the first visual task processing model, and the response map of the original image is acquired by fusing the object feature map and the auxiliary feature map and inputting fused object feature map and auxiliary feature map into the main path of the first visual task processing model. In the above process of generating the response map of the current video frame with the participation of the previous video frame and the response map of the previous video frame, the previous video frame and the response map of the previous video frame may provide relatively strong prior knowledge which may help to solve the problems which affect the prediction accuracy of the visual task processing model, such as complicated and changeable scenes and/or the difficulty in identifying objects, and thus the prediction accuracy of the visual task processing model is improved.

Figure 6:
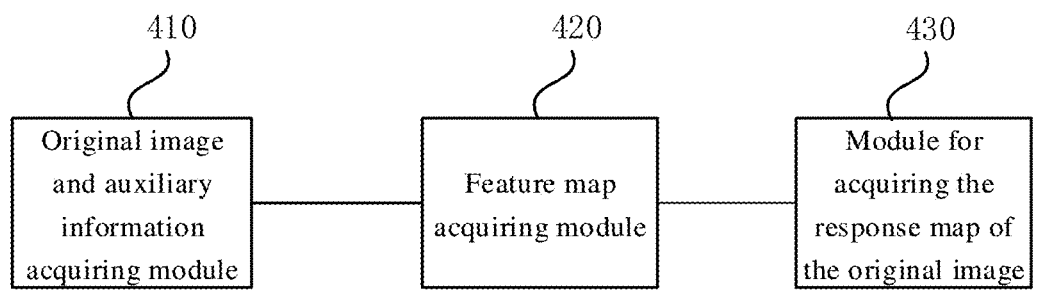
FIG. 6 is a schematic structural diagram of an apparatus for processing images according to an embodiment of the present disclosure.

FIG. 6 is a schematic structural diagram of an apparatus for processing images according to an embodiment of the present disclosure. The present embodiment may be applied to the situation of visual task processing. The apparatus may be realized by software and/or hardware. The apparatus may be configured in a device, typically a computer or a mobile terminal and etc. As shown in FIG. 6, the apparatus includes: an original image and auxiliary information acquiring module 410, a feature map acquiring module 420, and an original image response map acquiring module 430.

The original image and auxiliary information acquiring module 410 is configured to acquire an original image and the auxiliary information of the original image.

The feature map acquiring module 420 is configured to input the original image into a main path of a first visual task processing model to acquire an object feature map, and input the auxiliary information into a branch path of the first visual task processing model to acquire an auxiliary feature map.

The original image response map acquiring module 430 is configured to fuse the object feature map and the auxiliary feature map and input fused object feature map and auxiliary feature map into the main path of the first visual task processing model to acquire the response map of the original image.

In the technical solution of the present embodiment, the object feature map is acquired by acquiring the original image and the auxiliary information of the original image and inputting the original image into the main path of the first visual task processing model, and the auxiliary feature map is acquired by inputting the auxiliary information into the branch path of the first visual task processing model; the response map of the original image is acquired by fusing the object feature map and the auxiliary feature map and inputting the fused acquiring the original image and auxiliary information of the original image into the main path of the first visual task processing model. In the above process of generating the response map of the original image with the participation of the auxiliary information of the original image, the auxiliary information of the original image may provide relatively strong prior knowledge which helps to solve the problems which affect the prediction accuracy of the visual task processing model, such as complicated and changeable scenes and/or the difficulty in identifying objects, and thus the prediction accuracy of the visual task processing model is improved.

In some embodiments of the present disclosure, the image processing apparatus configured in the device may execute the method provided in any embodiment of the present disclosure, and has the corresponding functional modules and effects for executing the method.

Figure 7:
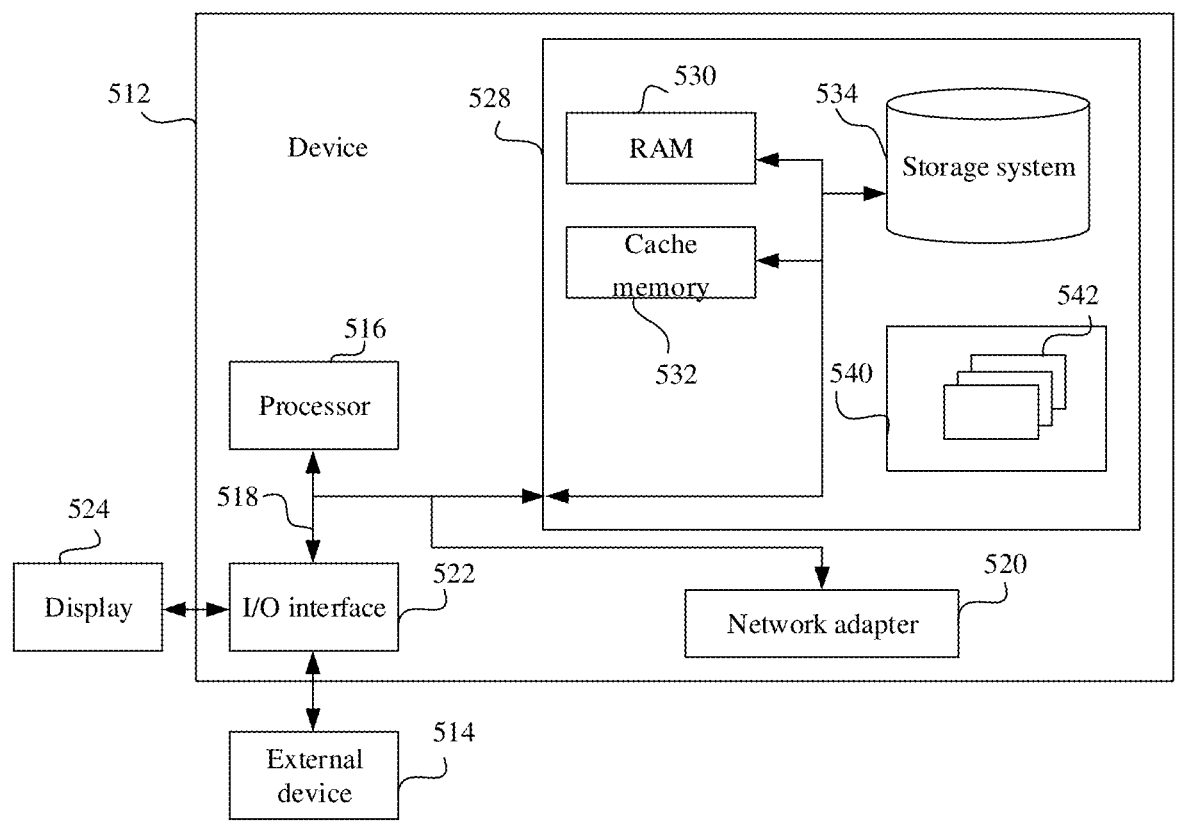
FIG. 7 is a schematic structural diagram of a device according to an embodiment of the present disclosure.

FIG. 7 is a schematic structural diagram of a device according to an embodiment of the present disclosure. FIG. 7 shows a block diagram of an exemplary device 512 suitable for implementing the embodiments of the present disclosure. The device 512 shown in FIG. 7 is only an example.

As shown in FIG. 7, the device 512 is embodied in the form of a general computing device. The device 512 may include the following assemblies: one or more processors 516, a system memory 528 and a bus 518 connected to different system assemblies (including the system memory 528 and the processor 516).

The system memory 528 may include a computer system readable medium in the form of a volatile memory, for example, a random-access memory (RAM) 530 and/or a cache memory 532. A storage system 534 may be configured to read and write a non-removable and non-volatile magnetic medium. The system memory 528 may include at least one program product having a group of (e.g., at least one) program modules configured to execute functions of the various embodiments of the present disclosure.

A program/utility tool 540 having a group of (at least one) program modules 542 may be stored in, for example, the memory 528, and the program module 542 generally executes the functions and/or methods in the embodiments described in the present disclosure.

The device 512 may also communicate with one or more external devices 514 (for example, a keyboard, a pointing device, a display 524, and the like). Such communication may be performed through an input/output (I/O) interface 522. Moreover, the device 512 may also communicate with one or more networks through a network adapter 520.

The processor 516 executes various functional applications and data processing by running programs stored in the system memory 528, for example, to implement a method provided by an embodiment of the present disclosure, and the method includes:

an original image and auxiliary information of the original image are acquired;

an object feature map is acquired by inputting the original image into a main path of a first visual task processing model, and an auxiliary feature map is acquired by inputting the auxiliary information into a branch path of the first visual task processing model; and a response map of the original image is acquired by fusing the object feature map and the auxiliary feature map and inputting fused object feature map and auxiliary feature map into the main path of the first visual task processing model.

The processor may also implement the solution of the image processing method applied to the device provided by any embodiment of the present disclosure. The hardware structure and the function of the device may be found in the explanation of contents of the embodiment.

In some embodiments of the present disclosure, a computer-readable storage medium storing a computer program thereon is provided, and when the program is executed by the processor, the program implements the method according to the embodiment of the present disclosure, and the method includes:

an original image and auxiliary information of the original image are acquired;

an object feature map is acquired by inputting the original image into a main path of a first visual task processing model, and an auxiliary feature map is acquired by inputting the auxiliary information into a branch path of the first visual task processing model; and a response map of the original image is acquired by fusing the object feature map and the auxiliary feature map and inputting fused object feature map and auxiliary feature map into the main path of the first visual task processing model.

In some embodiments of the present disclosure, a computer-readable storage medium is provided, and its computer-executable instructions include the operation method as described above, and may also execute the related operation according to the method provided by any one of the embodiments of the present disclosure.

What is claimed is:

1. A method for processing images, comprising:

acquiring an original image and auxiliary information of the original image;

acquiring an object feature map by inputting the original image into a main path of a first visual task processing model, and acquiring an auxiliary feature map by inputting the auxiliary information into a branch path of the first visual task processing model; and acquiring a response map of the original image by fusing the object feature map and the auxiliary feature map and inputting fused object feature map and auxiliary feature map into the main path of the first visual task processing model, wherein in the case that the original image is a single image, the auxiliary information of the original image comprises a background image corresponding to the original image, and in the case that the original image is a video frame in a video, and the video frame is used as a current video frame which is not a first frame of the video, the auxiliary information of the original image comprises a previous video frame of the current video frame and a response map of the previous video frame, wherein the response map of the previous video frame is acquired in following manners:

when the previous video frame belongs to one of first N video frames of a video, the response map of the previous video frame is a response map acquired by inputting the previous video frame into a second visual task processing model; and when the previous video frame does not belong to one of the first N video frames of the video, the response map of the previous video frame is a response map acquired by inputting the previous video frame into the first visual task processing model, wherein the second visual task processing model has higher prediction accuracy than the first visual task processing model, and N is a positive integer.

2. The method according to claim 1, wherein the response map of the previous video frame is acquired by following manners:

when the previous video frame belongs to one of first T video frames of a video frame sequence corresponding to the previous video frame, the response map of the previous video frame is a response map acquired by inputting the previous video frame into a second visual task processing model; and when the previous video frame does not belong to one of the first T video frames of the video frame sequence corresponding to the previous video frame, the response map of the previous video frame is a response map acquired by inputting the previous video frame into the first visual task processing model, wherein the video frame sequence is one of a plurality of video frame sequences acquired by dividing a plurality of video frames of a video, the second visual task processing model has higher prediction accuracy than the first visual task processing model, and T is a positive integer.

3. The method according to claim 1, wherein the first visual task processing model is trained in following manners:

acquiring an original training image, annotation information of the original training image and auxiliary training information of the original training image;

acquiring an object training feature map by inputting the original training image into a main path of a convolutional neural network, and acquiring an auxiliary training feature map by inputting the auxiliary training information into a branch path of the convolutional neural network;

acquiring a response map of the original training image by fusing the object training feature map and the auxiliary training feature map and inputting fused object training feature map and auxiliary training feature map into the main path of the convolutional neural network;

acquiring a loss function of the convolutional neural network according to the annotation information of the original training image and the response map of the original training image; and adjusting a network parameter of the convolutional neural network according to the loss function until an output value of the loss function is less than or equal to a preset threshold, and taking the convolutional neural network as the first visual task processing model.

4. The method according to claim 3, wherein the auxiliary training information is auxiliary training information acquired after being subjected to a data augmenting processing.

5. The method according to claim 4, wherein the data augmenting processing comprises at least one of translation, rotation, clipping, non-rigid transformation, noise interference and color transformation.

6. An apparatus for processing images, comprising:

an original image and auxiliary information acquiring module configured to acquire an original image and auxiliary information of the original image;

a feature map acquiring module configured to acquire an object feature map by inputting the original image into a main path of a first visual task processing model, and acquire an auxiliary feature map by inputting the auxiliary information into a branch path of the first visual task processing model; and an original image response map acquiring module configured to acquire a response map of the original image by fusing the object feature map and the auxiliary feature map and inputting fused object feature map and auxiliary feature map into the main path of the first visual task processing model;

wherein in the case that the original image is a single image, the auxiliary information of the original image comprises a background image corresponding to the original image, and in the case that the original image is a video frame in a video, and the video frame is used as a current video frame which is not a first frame of the video, the auxiliary information of the original image comprises a previous video frame of the current video frame and a response map of the previous video frame, wherein the response map of the previous video frame is acquired in following manners:

when the previous video frame belongs to one of first N video frames of a video, the response map of the previous video frame is a response map acquired by inputting the previous video frame into a second visual task processing model; and when the previous video frame does not belong to one of the first N video frames of the video, the response map of the previous video frame is a response map acquired by inputting the previous video frame into the first visual task processing model, wherein the second visual task processing model has higher prediction accuracy than the first visual task processing model, and N is a positive integer.

7. A device, comprising:
one or more processors; and
a memory configured to store one or more programs,
wherein the one or more programs is executed by the one or more processors to cause the one or more processors to realize the method according to claim 1.

8. A non-transitory computer-readable storage medium storing a computer program thereon, wherein when the computer program is executed by a processor, the method according to claim 1 is realized.

9. A device, comprising:
one or more processors; and
a memory configured to store one or more programs,
wherein the one or more programs is executed by the one or more processors to cause the one or more processors to realize the method according to claim 2.

10. A non-transitory computer-readable storage medium storing a computer program thereon, wherein when the computer program is executed by a processor, the method according to claim 2 is realized.

11. A device, comprising:
one or more processors; and
a memory configured to store one or more programs,
wherein the one or more programs is executed by the one or more processors to cause the one or more processors to realize the method according to claim 3, and wherein first visual task processing model is used to process a visual task, and the visual task includes one of image classification, image segmentation, object detection, key point positioning, and posture estimation.

12. A device, comprising:
one or more processors; and
a memory configured to store one or more programs,
wherein the one or more programs is executed by the one or more processors to cause the one or more processors to realize the method according to claim 4.

13. A device, comprising:
one or more processors; and
a memory configured to store one or more programs,
wherein the one or more programs is executed by the one or more processors to cause the one or more processors to realize the method according to claim 5.

\* \* \* \* \*